April 19, 1932. P. W. BROWN 1,855,091
CLOD CRUSHER AND SOIL PULVERIZER
Filed Sept. 1, 1931 2 Sheets-Sheet 1

Parson W. Brown
INVENTOR

BY Victor J. Evans
and Co. ATTORNEY

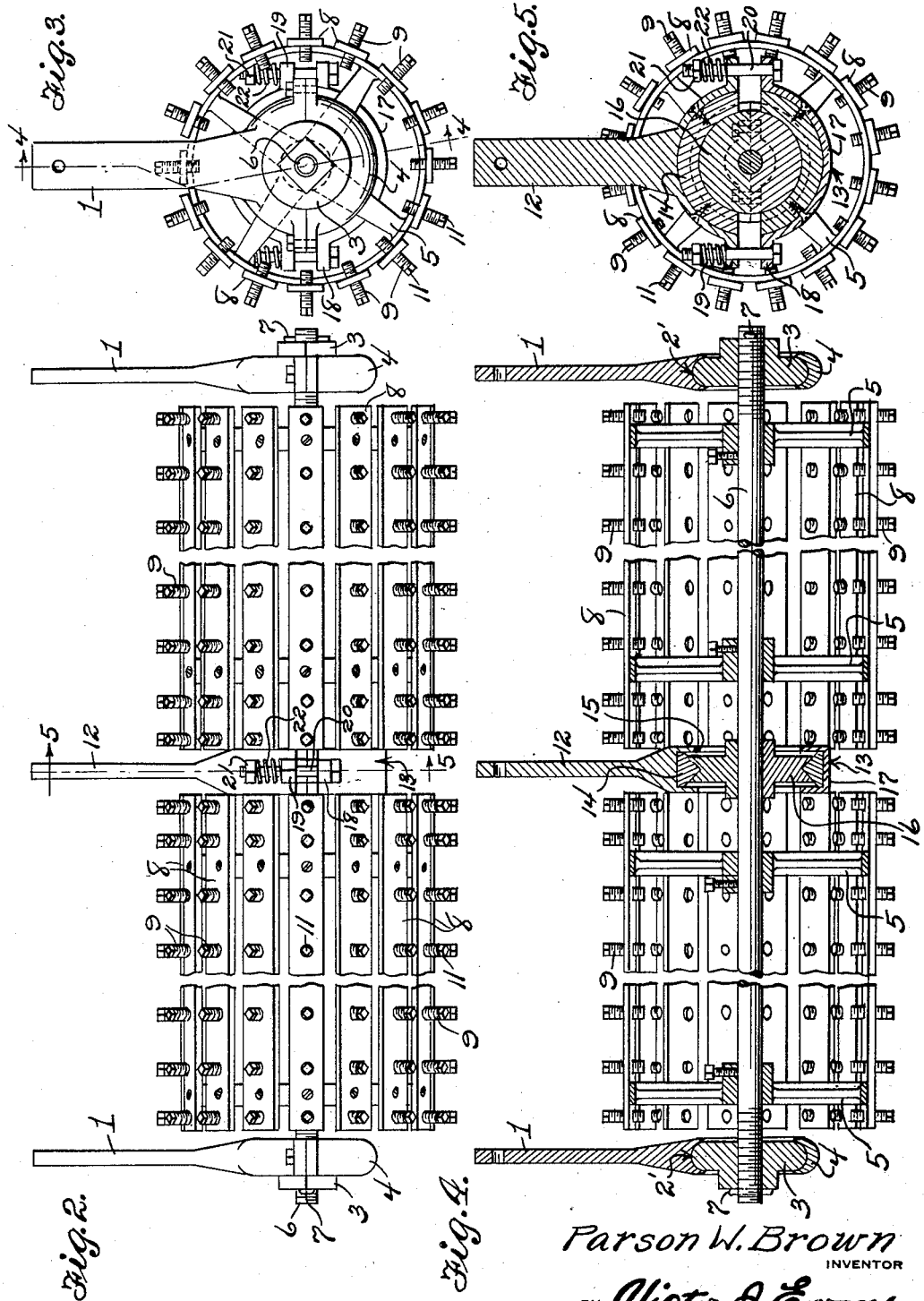

Patented Apr. 19, 1932

1,855,091

UNITED STATES PATENT OFFICE

PARSON W. BROWN, OF LINGLE, WYOMING

CLOD CRUSHER AND SOIL PULVERIZER

Application filed September 1, 1931. Serial No. 560,639.

This invention relates to a combined clod crusher and soil pulverizer especially adapted to be attached to the frame of a cultivator and it consists in the novel features hereinafter described and claimed.

An object of the invention is to provide an attachment of the character indicated which is of simple and durable structure and including bearing arms adapted to be applied to the frame of the cultivator and having at their lower ends bearing recesses adapted to receive head members which are journaled therein. The ends of a shaft are adjustably fixed to said head members and at intervals along the shaft spiders are mounted and upon the peripheries of said spiders crushing and pulverizing bars are mounted. Soil penetrating teeth are mounted upon said bars and are adapted to enter the surface of the soil and break any crust that may occur at the surface area of the soil. Means are provided at the intermediate portion of the said shaft for retarding the turning movement thereof in order that the said teeth may be caused to drag in the soil and thereby mulch the same. When the bars come in contact with the surface of the soil the clods are crushed and the soil is pulverized at the surface.

In the accompanying drawings:—

Figure 2 is a side elevational view of the clod crusher and soil pulverizer.

Figure 3 is an end view of the same.

Figure 4 is a longitudinal sectional view of the same cut on the line 4—4 of Figure 3, and Figure 5 is a transverse sectional view of the same cut on the line 5—5 of Figure 2.

Figure 1:
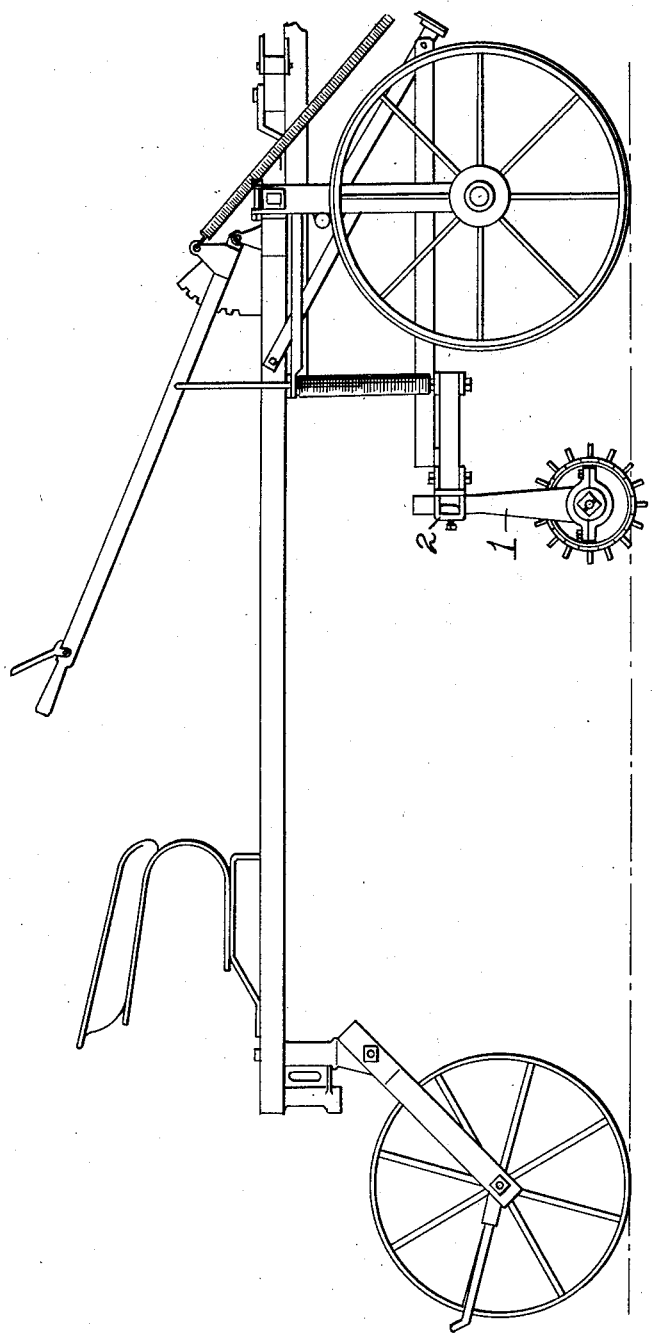
Figure 1 is a side elevational view of a cultivator frame with the clod crusher and soil pulverizer attached thereto.

As illustrated in the accompanying drawings the frame of the cultivator to which the attachment is applied may be of any design or pattern such as is usually applied for cultivating crops as beets.

The attachment includes arms 1 which are secured at their upper ends to the frame of the cultivator by means of clamp devices 2 or other suitable attaching means. The arms 1 are provided at their lower ends with recesses 2' which receive head members 3, the said head members being journaled for rotation in the said recesses. The edges of the recesses 2' extend down along the sides of the head members 3 as shown in Figure 4 of the drawings so that the said head members may not become dislodged from the recesses after they have been properly positioned therein. Sections 4 are applied to the lower ends of the arms 1 and the said sections are provided with curved inner surfaces which receive the lower portions of the head members 3 and whereby the upper portions of the peripheries of the head members are held in the recesses 2'. Spider members 5 are mounted upon a shaft 6 at intervals and the ends of the said shaft are screwed into the centers of the head members 3. Pins 7 pass through the ends of the shaft 6 and bear against the outer surfaces of the head members 3 and prevent the shaft from unscrewing from the head members. Longitudinally disposed bars 8 are mounted upon the peripheries of the spiders 5 and the said bars are disposed approximately parallel with relation to each other. Soil penetrating spikes 9 are screwed into the bars 8 and lock nuts 10 are screwed upon the spikes 9 and bear at their inner surfaces against the outer surfaces of the bars and securely lock the spikes in position upon the bars. The outer ends of the spikes 9 are squared as at 11.

An arm 12 is secured at its upper end to the frame of the cultivator and is provided at its lower end with a casing chamber 13. A brake shoe 14 is housed in the chamber 13 and is provided with an inner cone shaped surface 15 which bears in a groove provided in the periphery of a disk 16 mounted upon the intermediate portion of the shaft 6. A section 17 receives the lower portion of the brake shoe 14, the section 17 is provided at its ends and at its outer sides with lugs 18 and similar lugs 19 are mounted upon the lower end of the arm 5. Bolts 20 pass through the lugs 18 and 19 and have nuts 21 screwed upon their upper ends. Springs 22 are interposed between the nuts 21 and the lugs 19 and by tightening the nuts 21 upon the bolts 20 the springs 22 are compressed whereby the frictional contact between the shoe 14 and the periphery of the disk 16 may be increased or diminished as desired.

The operation of the device is as follows: As the cultivator frame is passed over the surface of the soil the teeth or spikes 9 upon the lower bars penetrate the surface of the soil and thus the spiders are made to rotate with the shaft 6 and as the teeth come in contact with the crust of the soil the crust is broken, mulched, and the clods are crushed and pulverized by the teeth and the bars. By tightening the bolts 21 upon the nuts 20 the shoe 14 may be brought into tight frictional contact with the peripheral groove of the disk 16 and thus the rotation of the shaft and the parts carried thereby may be retarded so that the teeth will drag through the soil and thoroughly break the same.

Having described the invention what is claimed is:

1. A clod crusher and soil pulverizer attachment comprising arms provided at their lower ends with bearing recesses, head members journaled in said recesses, a shaft fixed to the head members, spiders mounted upon the shaft, bars mounted upon the peripheries of the spiders, spike teeth carried by the bars, an arm adapted to be applied to a cultivator and provided at its lower end with a chamber, said shaft passing through said chamber, a brake shoe located in the chamber and a disk mounted upon the shaft and engaging said brake shoe.

2. A clod crusher and soil pulverizer attachment comprising arms provided at their lower ends with bearing recesses, head members journaled in said recesses, a shaft fixed to the head members, spiders mounted upon the shaft, bars mounted upon the peripheries of the spiders, spike teeth carried by the bars, an arm adapted to be applied to a cultivator and provided at its lower end with a chamber, said shaft passing through said chamber, a brake shoe located in the chamber and a disk mounted upon the shaft and engaging said brake shoe and means for increasing or diminishing the frictional contact between the brake shoe and the disk.

3. A clod crusher and soil pulverizer attachment comprising arms provided at their lower ends with recesses, head members journaled in said recesses, a shaft fixed to the head members, spiders mounted upon the shaft, spike carrying bars mounted upon the spiders, an arm located between the first mentioned arms and provided at its lower end with a casing chamber, a section closing the lower end of said chamber, a brake shoe housed within the casing chamber, a disk mounted upon the shaft and engaged by the brake shoe, lugs provided at the lower end of the said arm and the upper end of said section, bolts passing through said lugs, nuts screwed upon the bolts and springs interposed between the nuts and certain of the said lugs.

In testimony whereof I affix my signature.

PARSON W. BROWN.